United States Patent

Ino

[11] Patent Number: 6,151,530
[45] Date of Patent: Nov. 21, 2000

[54] ACTUATOR CONTROLLER PROVIDED WITH PROGRAM REPLACEMENT PROTECTION

[75] Inventor: Yukihiro Ino, Zama, Japan

[73] Assignee: Nissan Motor Co., Ltd., Yokohama, Japan

[21] Appl. No.: 09/034,332

[22] Filed: Mar. 4, 1998

[30] Foreign Application Priority Data

Mar. 4, 1997 [JP] Japan ................................. 9-049061

[51] Int. Cl.[7] ................................................ G05B 13/02
[52] U.S. Cl. .............................. 700/47; 700/2; 700/83; 700/86; 700/87; 701/101; 701/107; 327/142; 84/603
[58] Field of Search .................... 700/2, 47, 86, 700/87, 83; 701/101, 107; 327/142; 84/603

[56] References Cited

U.S. PATENT DOCUMENTS

| | | | |
|---|---|---|---|
| 4,277,829 | 7/1981 | Tokuda et al. | 701/101 |
| 4,630,577 | 12/1986 | Cornacchia | 123/179.3 |
| 5,170,338 | 12/1992 | Moritoki et al. | 364/131 |
| 5,247,444 | 9/1993 | Arai et al. | 701/107 |
| 5,313,395 | 5/1994 | Kawai et al. | 364/431.07 |
| 6,019,082 | 2/2000 | Mashiki et al. | 123/308 |

FOREIGN PATENT DOCUMENTS

7-287605  10/1995  Japan .

*Primary Examiner*—Ayaz R. Sheikh
*Assistant Examiner*—Frantz B. Jean
*Attorney, Agent, or Firm*—Foley & Lardner

[57] ABSTRACT

A first microprocessor controls an actuator according to a control program stored in a program storage memory, using a learnt value stored in a learning value storage memory. The learnt value is updated in response to an action of the actuator. A second microprocessor is connected to the first microprocessor to replace the control program with another control program which also has a function to initialize the learnt value. However, when the learnt value has been updated, the first microprocessor prohibits the second microprocessor from replacing the control program, thereby preventing the impairment of control response due to initialization of the learnt value.

11 Claims, 8 Drawing Sheets

SECOND EMBODIMENT

THIRD EMBODIMENT

ACTUATOR CONTROLLER PROVIDED WITH PROGRAM REPLACEMENT PROTECTION

FIELD OF THE INVENTION

This invention relates to updating of a memory built into a control device of an actuator.

BACKGROUND OF THE INVENTION

A microcomputer comprising a Central Processing Unit (CPU), memories and Input/Output Interface (I/O interface) is widely used as a control unit of an actuator.

The memories of such a microcomputer comprise a Read Only Memory (ROM) for storing a control program and basic data, and a Random Access Memory (RAM) for storing data which frequently changes.

Generally, the ROM is a memory which cannot be updated, but in some cases it is necessary to update the control program and basic data stored in the ROM.

One type of memory meeting this need is a flash memory which permits electrical erasing and writing using an external tool. Tokkai Hei 7-287605 published by the Japanese Patent Office in 1995 discloses an engine control unit using a flash memory as a ROM.

When such a flash memory is used as a ROM of a control unit for controlling an actuator, however, the following problems may arise.

There is a case where a control unit of an actuator learns control parameters, and it backs up the values in a non-volatile memory such as a Static Random Access Memory (SRAM) even after the actuator has stopped so that they can be applied the next time the actuator starts.

When the control program of a flash memory is updated in such a control unit, the learnt values stored in the non-volatile RAM are also initialized.

This is because an initialization process which initializes various parameters when the control program starts is built into the control program. This initialization process is necessary in order to prevent false operation of the control program after it is written into the memory.

However when the learnt values are initialized by this process, learning must be repeated under the updated control program from the beginning. Therefore, some time is required until the control state of the actuator after updating of the ROM returns to its control state before updating of the ROM.

The idle rotation speed of a vehicle engine is adjusted using an auxiliary air valve which for example, is driven by a step motor. In this case, if a flow coefficient of the auxiliary air valve becomes smaller than a reference value due to production errors or temporal deterioration of construction parts, an auxiliary air volume during idle running will of course be insufficient, and the idle rotation speed will not reach its target value.

The learnt values are numerical representations obtained by learning characteristics which are unique to each individual piece of equipment. In the case of a control unit controlling the aforementioned auxiliary air valve, a learning value is memorized as a step number of the step motor and is applied to the subsequent control.

However in such a control unit when the learnt value has been initialized due to updating of a ROM as described hereabove, the idle rotation speed does not reach its target value until the learnt value returns by another learning process to the value before the ROM was updated.

SUMMARY OF THE INVENTION

It is therefore an object of this invention to prevent initialization of a learnt value by updating of a control program.

In order to achieve the above object, this invention provides a controller for controlling an actuator, comprising a first microprocessor comprising a program storage memory for storing a control program for performing learning control of the actuator using a learnt value and a learnt value storage memory for storing the learnt value, and a second microprocessor which can be connected to the first microprocessor and is programmed to replace the control program in the program storage memory with an auxiliary control program, the auxiliary control program having a function to initialize the learnt value to an initial value.

The first microprocessor is programmed to output a control signal to the actuator based on the program, update the learnt value in response to an action of the actuator, determine whether or not updating of the learnt value has been performed, and prohibit replacement of the control program by the second microprocessor when updating of the learnt value has been performed.

The program storage memory and learnt value storage memory comprise memories for retaining stored contents when the first microprocessor is not operating.

The control program is for example an engine idle rotation speed control program for controlling a step motor which increases and decreases an opening of an engine auxiliary air valve.

It is preferable that the first microprocessor is further programmed to return the learnt value to the initial value when updating of the learnt value has been performed.

It is further preferable that the first microprocessor is further programmed to prohibit replacement of the control program by the second microprocessor for a predetermined period after the learning value has been returned to the initial value.

It is also preferable that the first microprocessor is further programmed to compute a difference between the learnt value and the initial value when updating of the learnt value has been performed, transmit the difference to the second microprocessor and return the learnt value to the initial value, and the second microprocessor is further programmed to correct the initial value based on the difference.

It is also preferable that the second microprocessor is further programmed to transmit a specific code to the first microprocessor and the first microprocessor is further programmed to prohibit replacement of the control program by the second microprocessor when the specific code has not been input.

The details as well as other features and advantages of this invention are set forth in the remainder of the specification and are shown in the accompanying drawings.

DESCRIPTION OF THE PREFERRED EMBODIMENTS

Figure 1:
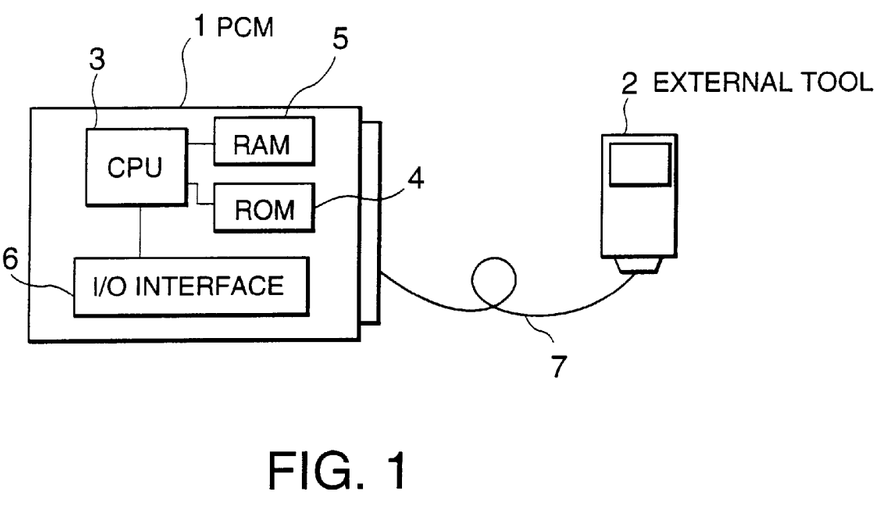
FIG. 1 is a schematic diagram of a power train control module (PCM) and a ROM updating external tool according to this invention.

Referring to FIG. 1 of the drawings, a power train control module (PCM) 1 is a device which integrates a control unit for controlling an engine of a vehicle and a control unit for controlling an automatic transmission of the vehicle.

Power train is a term for representing the drive system comprising the engine and the transmission.

The PCM 1 comprises a CPU 3, ROM 4, various non-volatile memories including a RAM 5 and an I/O interface 6, and the CPU3 controls the power train according to a control program stored in the ROM 4. The ROM 4 comprises a flash memory which permits write and erase, or an Electric Erasable Programmable ROM (EEPROM).

The contents of the ROM 4 are updated by an external tool 2 connected to the PCM 1 via a serial cable 7. The external tool 2 comprises a microcomputer comprising a CPU, memory and I/O interface. The serial cable 7 is applied only for the purpose of updating the contents of the ROM 4. In other situations, the serial cable 7 is not present and the control of the power train by the PCM 1 is performed when there is no connection to the external tool 2.

The non-volatile RAM 5 comprises a Static Random Access Memory (SRAM) or a Dynamic RAM (DRAM) which continues operating due to battery current even after the engine has stopped. The control of the power train performed by the PCM 1 also comprises control of the above-mentioned engine idle rotation speed. The values related to learning control of the engine idle rotation speed are stored by the non-volatile RAM 5 after the engine has stopped, and are applied when the engine is run on the next occasion.

In this PCM 1, information such as a learning experience flag showing whether a learnt value was updated from an initial value and a value of an update frequency counter showing a learnt value update state, is stored along with the learnt value in the non-volatile RAM 5.

When for example a bug is discovered in the idle rotation speed control program, there is a need to replace the program with a new version in which the bug has been fixed. In such a case, the external tool 2 is connected to the PCM 1 by the serial cable 7 as shown in FIG. 1, data for updating the program in the ROM 4 are transmitted to the PCM 1 from the external tool 2, and the control program stored by the ROM 4 is updated to a new version.

This updating is performed in a state where the ignition switch of the vehicle is ON without removing the PCM 1 from the vehicle.

The PCM 1 determines whether or not the updating of the learnt value has been performed from the above-mentioned learning experience flag, and when the learnt value has been updated, a signal prohibiting updating of the ROM 4 is transmitted to the external tool 2.

On the other hand when the learnt value has not been updated, i.e. when the initial value is simply maintained as the learnt value, updating of the ROM 4 is permitted and the control program is updated.

Next, exchange of signals between the external tool 2 and PCM 1 is described.

When the ROM 4 is to be updated, a security check is first performed between the external tool 2 and PCM 1. This security check is the exchange of a code that is performed before memory updating so that only an authorized person can update the contents of the ROM 4.

In the PCM 1, updating of the contents of the ROM 4 is prohibited in a default state. When a prohibition removal code is sent to the PCM 1 from the external tool 2, the PCM 1 compares this code with prestored data, and when it coincides with the prestored data the prohibition of the memory updating is removed and a signal informing the fact is transmitted to the outside tool 2. This completes the security check.

When the correct external tool 2 is not used, the prohibition of the memory updating is not removed because the code does not coincide.

After the security check is complete, a memory updating request signal is then sent to the PCM 1 by the external tool 2. When this signal is received, the PCM 1 executes a memory updating request signal receive process shown in the flowchart of FIG. 3. This process is performed at an interval of ten milliseconds.

Figure 3:
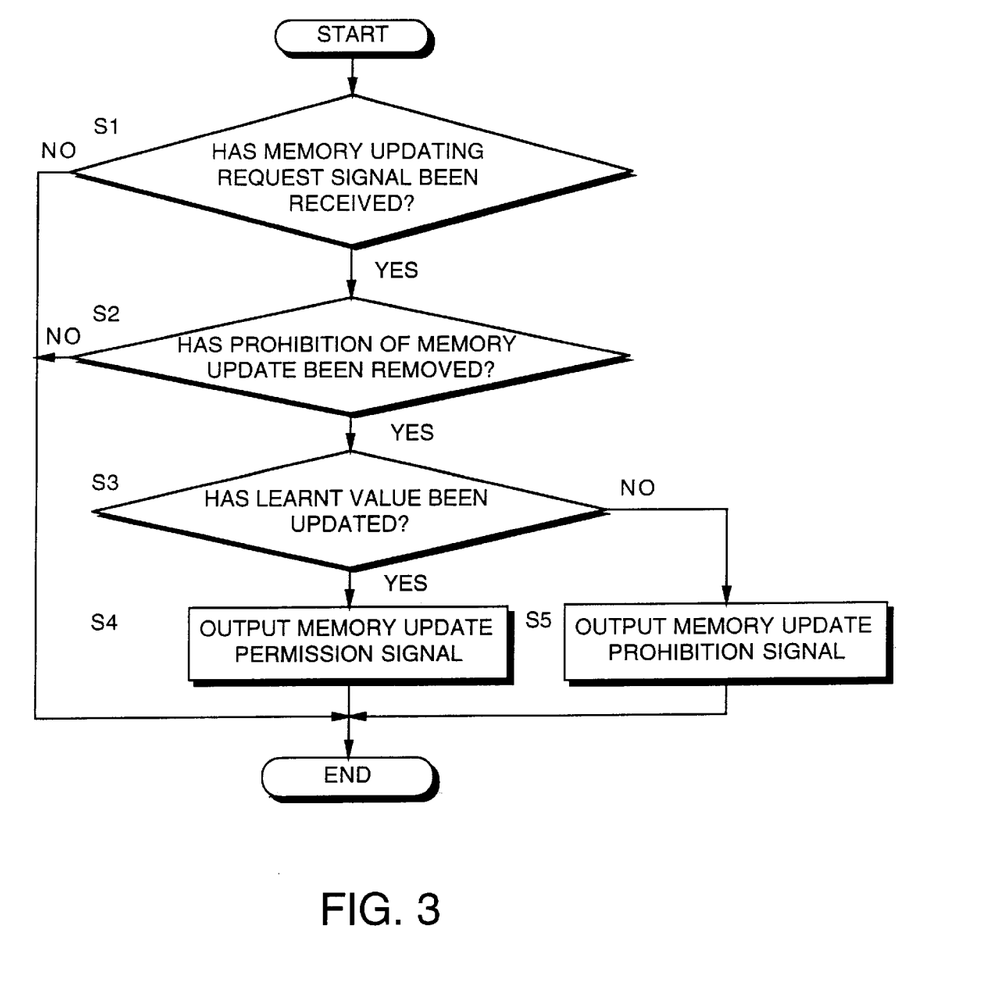
FIG. 3 is a flowchart for describing a process performed by the PCM when a ROM updating request signal is received.

First, in a step S1, it is determined whether or not a memory updating request signal was received. When the updating request signal was received, it is determined in a step S2 whether or not the prohibition of memory updating has been removed.

When either of the determination results of the steps S1 and S2 is negative, the process is terminated without performing subsequent processing.

When both the determination results of the steps S1 and S2 are affirmative, in a step S3, it is determined whether or not the learnt value stored in the non-volatile RAM 5 has been updated. This is done by determining the value of the aforementioned learning experience flag.

During idle rotation speed control, due to intake throttle opening errors, auxiliary air valve flowrate characteristic errors, bypass flowpath surface area errors or time dependent deterioration of a control mechanism, a constant deviation may occur between a target rotation speed and a true rotation speed.

The learnt value is a means of absorbing this steady deviation by experience. For example, when the flow coefficient of the auxiliary air valve is smaller than a standard value, the idle rotation speed will always be lower than the target value due to insufficient auxiliary air volume.

In feedback control of idle rotation speed, it is attempted to eliminate this deviation by supplying a feedback signal which always tends to correct the opening of the auxiliary air valve in the direction of larger opening, to a step motor which opens and closes the auxiliary air valve. This feedback signal is learned, and by supplying the learnt value which has converged, to a step motor beforehand, the idle rotation speed is controlled to a target value immediately after engine startup.

When this learnt value is updated even on one occasion, the PCM 1 modifies the learning experience flag from "0" to "1".

The aforementioned updating frequency counter is also incremented whenever the learnt value is updated.

As this flag and counter value are stored in the non-volatile RAM 5, it can be determined from the flags and counter value whether or not the learnt value has been updated.

As a result, when the learning experience flag =0 or the learning update frequency counter =0, the routine proceeds to a step S4 and a memory update permission signal is returned to the external tool 2.

When the learning experience flag =1 or the learning update frequency counter =1 or more, a memory update prohibiting signal is returned to the external tool 2 in a step S5.

The determination performed in the step S3 as to whether or not the learnt value is updated may be based either on the learning experience flag or the learning update frequency counter. However if the routine is allowed to proceed to step S3 only when both are 0, confirmation that learnt value has not been updated from their initial value is more reliable.

When the aforesaid memory update request signal receive process is executed by the PCM 1, and a memory update permission signal is consequently output to the external tool 2, the external tool 2 executes a memory update permission signal receive process.

Next, this process will be described referring to FIG. 4. This process is also executed at an interval of ten milliseconds.

First, in a step S11, the memory update permission signal is determined. When the memory update permission signal is received, memory updating data are transmitted to the PCM 1 in a step S12. When the update permission signal is not received, or when the memory update prohibiting signal is received, the process is terminated without performing any operation.

Referring again to FIG. 2, when the PCM 1 receives memory updating data, it updates the contents of the ROM 4 by the received data. A new control program is stored in the ROM 4 of the PCM 1 due to this updating.

Figure 2:
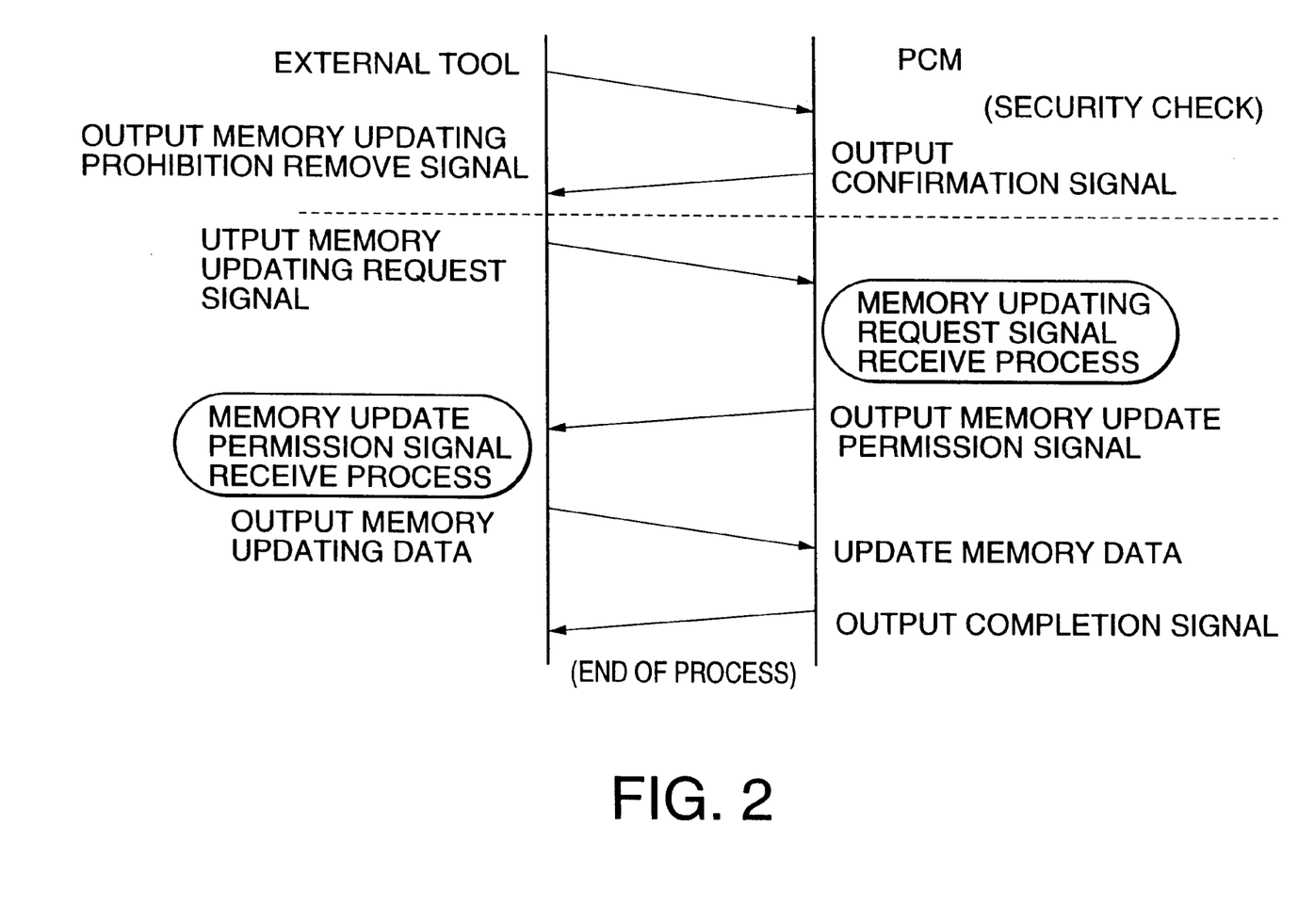
FIG. 2 is a diagram of a communication sequence between the PCM and the external tool.

When this updating is complete, the PCM 1 again prohibits the updating of the contents of the ROM 4 which was once permitted, and transmits an updating termination signal to the outside tool 2. Upon receipt of this signal, the external tool 2 verifies that updating of ROM 4 is complete.

By thus permitting updating the contents of ROM 4 only when the learnt value has not been updated from the initial value, response delay of idle rotation speed control due to application of the initial value to the learnt value is prevented.

A second embodiment of this invention will now be described referring to FIG. 5.

This flowchart is similar to the process of FIG. 3 of the aforesaid first embodiment.

A difference from the first embodiment is the addition of a step S21.

When the learnt value is determined to be updated in the step S3, in the step S21, the learnt value is initialized to the initial value, and the learning experience flag and learning update frequency counter are each reset to 0. The memory update prohibiting signal is then transmitted to the external tool 2 in the step S5.

Therefore, when this process is next executed, It is determined that the learnt value is not updated in step S3, and the memory update permission signal is transmitted to the external tool 2 in the step S4.

When the ROM 4 is updated without asking for learnt value as in the prior art device, the learnt value is reset to the initial value at a time point when the updated control program first operates. In this embodiment, the learnt value is returned to its initial value before the updating of the control program.

This difference has the following implication.

When the learning value returns to its initial value, the step number output from the PCM 1 to the step motor which operates an auxiliary air valve varies, and the opening of an auxiliary air valve varies accordingly. However, due to a delay in the operation of the step motor and auxiliary air valve, a predetermined operating time elapses from output of the signal to when the opening changes. In the prior art device, as the learnt value is initialized immediately after the updated control program starts, the auxiliary air valve still has an opening corresponding to the learnt value before initialization at the time point when the updated control program operates. Although learning is performed in this state, the learnt value begins to converge only after the auxiliary air valve has an opening corresponding to the initial value.

According to the second embodiment, a time of ten milliseconds elapses after the learnt value was initialized until updating of the memory is permitted. Further, as the contents of the ROM 4 are updated after memory updating is permitted, more time elapses until the updated control program functions. Therefore during this interval, the opening of the auxiliary air valve is changed to a position corresponding to the initial value. As a result, less time is required for convergence of the learnt value after update of the program as compared to the prior art device.

A third embodiment of this invention will now be described referring to FIGS. 6 and 7.

Figure 4:
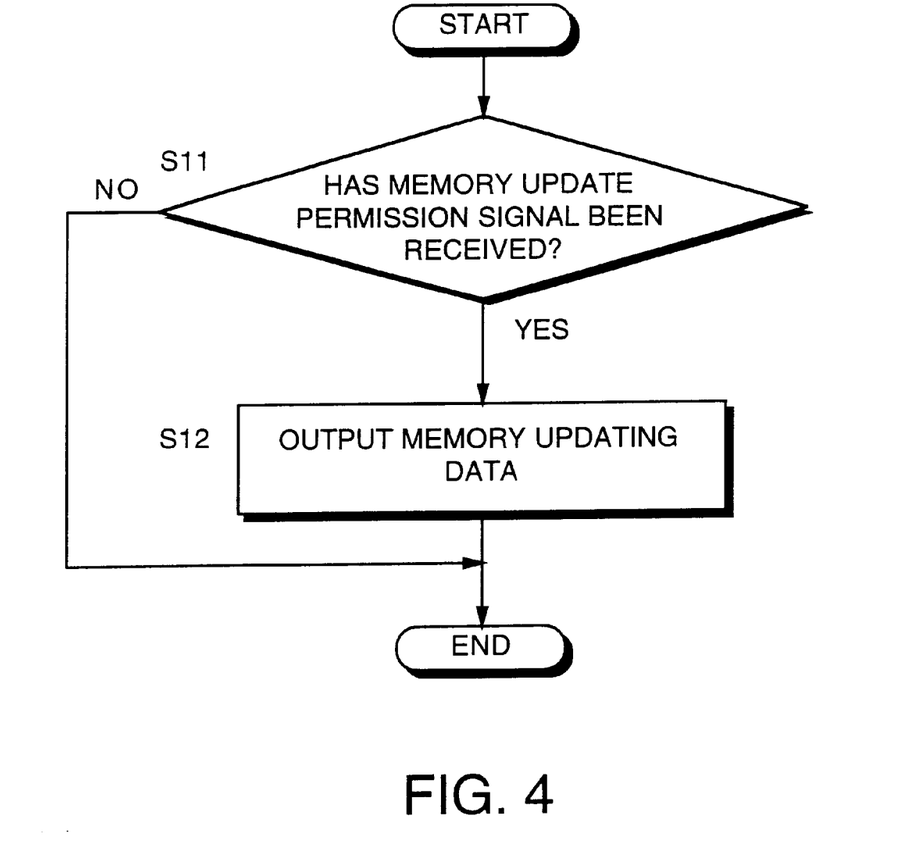
FIG. 4 is a flowchart for describing a process performed by the external tool when a ROM updating permission signal is received.
Figure 5:
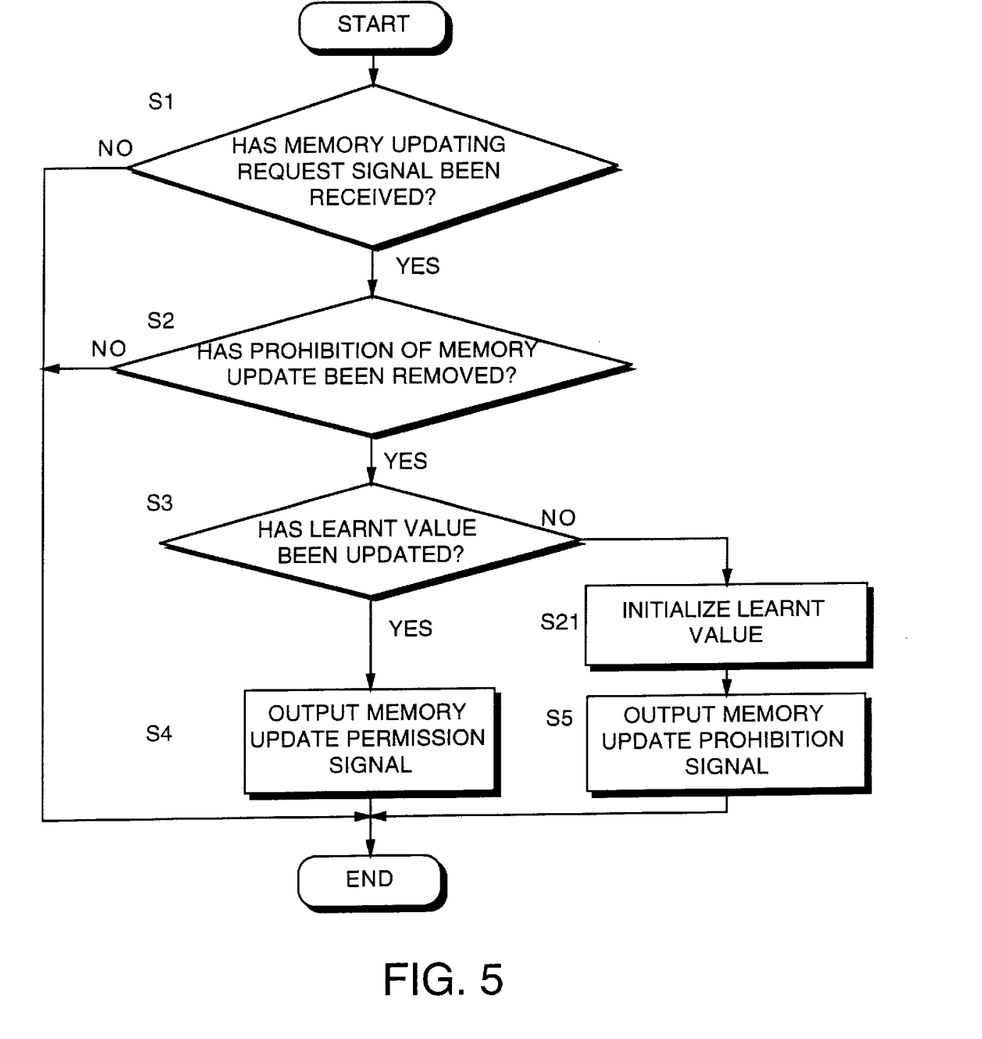
FIG. 5 is similar to FIG. 3, but showing a second embodiment of this invention.
Figure 6:
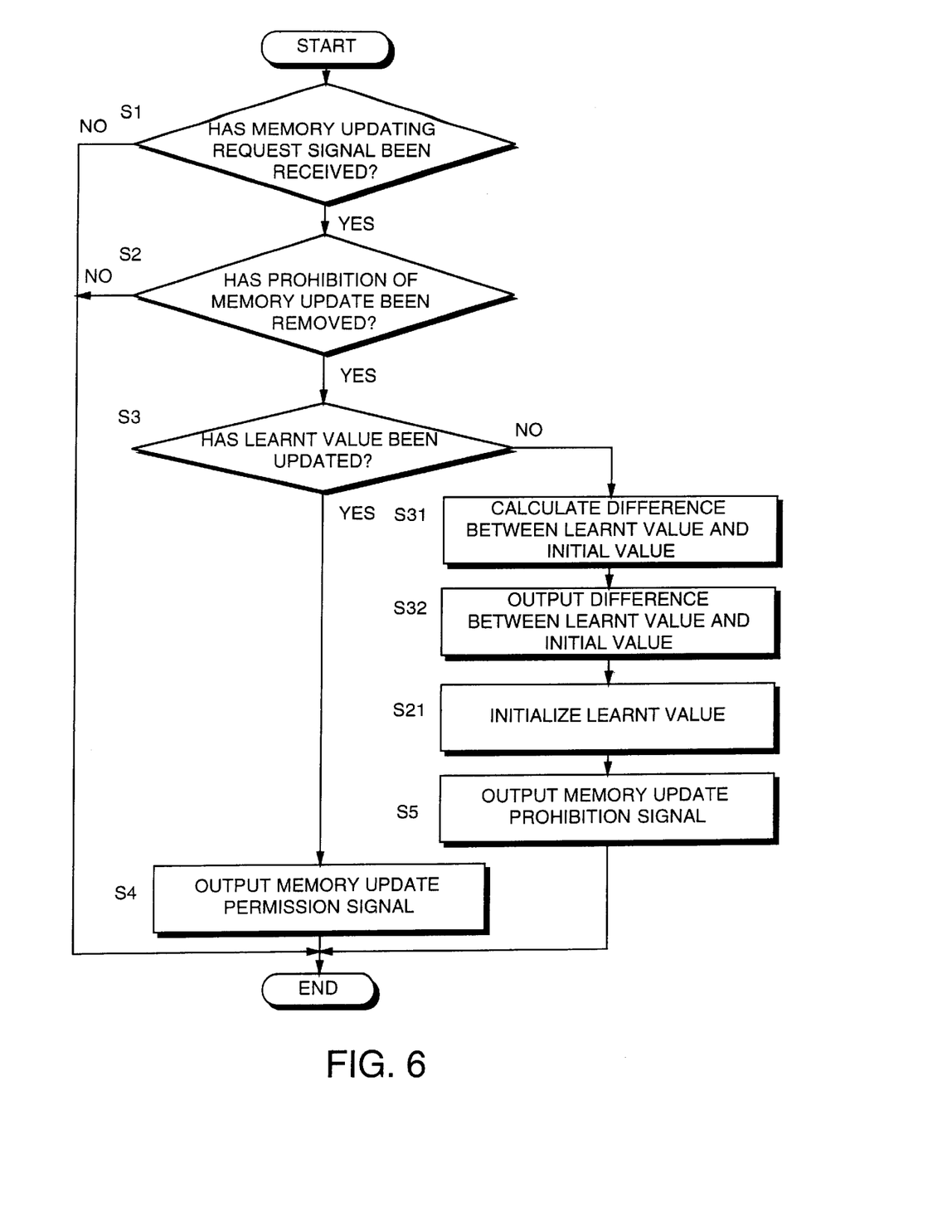
FIG. 6 is similar to FIG. 5, but showing a third embodiment of this invention.
Figure 7:
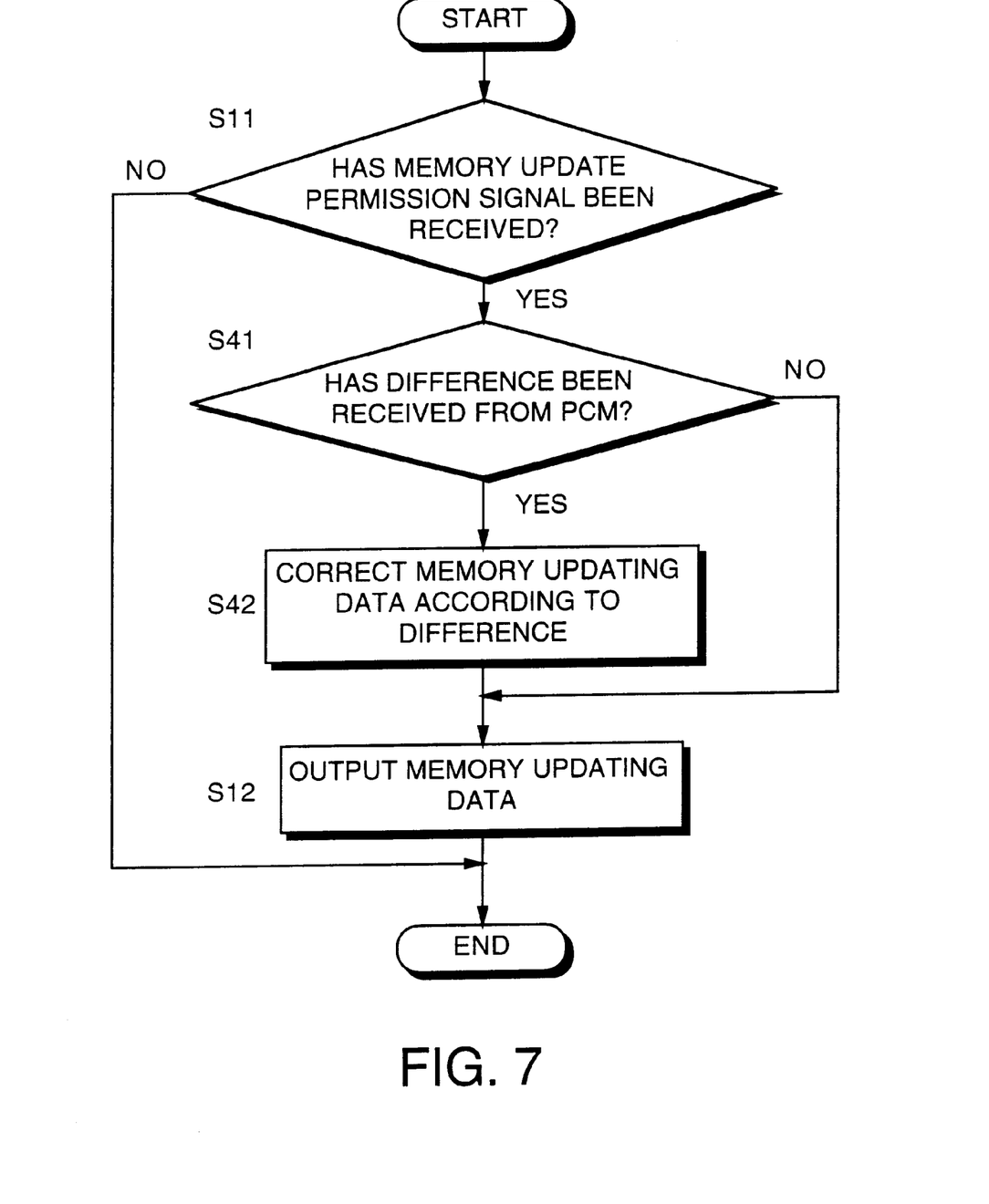
FIG. 7 is a flowchart for describing a process performed by the external tool when a ROM updating permission signal is received, according to the third embodiment of this invention.

The flowchart of FIG. 6 is similar to that of FIG. 5, and the flowchart of FIG. 7 is similar to that of FIG. 4.

A difference between this embodiment and the second embodiment is that in the ROM updating request signal receive process performed by the PCM 1, steps S31, S32 are provided before the step S21.

Specifically, in the step S31, a difference between the learnt value and initial value is calculated when the learnt value is determined to be updated in the step S3.

It the step S32, this difference is transmitted to the external tool 2.

In the step S21 the learnt value is returned to the initial value, and the learning experience flag and learning update frequency counter are reset to 0 respectively. Then, a memory update prohibiting signal is transmitted to the external tool 2 in the step S5.

On the other hand, in the ROM update permission signal process performed by the external tool 2, new steps S41 and S42 are provided between the step S11 and S12.

In the step S41, it is determined whether or not the difference between a learnt value and initial value was received from the PCM 1.

When it was received, a correction according to this difference is applied to the memory updating data in the step S42. The corrected memory updating data are transmitted to the PCM 1 in the step S12.

For example, assume that the learnt value before initialization is 55H and the initial value is FFH. H on the far right edge of these values is a symbol indicating a hexadecimal number, the two left-hand digits indicating the value. Therefore, 55H corresponds to 85 and FFH corresponds to 256 in decimal notation.

FFH−55H =AAH, which is the difference between these two values, is transmitted to the external tool 2. The external tool 2 subtracts AAH from FFH which is the initial value, and the result 55H is stored in the storage location of the initial value of the learnt value set in the memory updating data.

Then, at a point in time when the updated control program first operates, the learnt value in the non-volatile RAM 5 of the PCM 1 is initialized to 55H.

When the initial value is OOH, the learnt value is equal to the difference. In this case, the calculation in the step S31 of FIG. 6 may be omitted and the learnt value may directly be transmitted to the external tool 2 as the difference between the learnt value and the initial value. This value is then stored in the storage location of the initial value in the step S42 of FIG. 7.

According to this embodiment, after updating of the ROM 4, the learnt value obtained before updating of the ROM 4 is reflected in the initial value of the learnt value applied when the control program first operates. Therefore, even when the control program in the ROM 4 is updated while a learnt value different from the initial value is in the non-volatile RAM 5, precise idle rotation speed control is assured from the first time when the updated program operates.

A difference In the handling of the initial value of the learnt value in the aforesaid second and third embodiments will now be described with reference to FIGS. 8A, 8B and FIGS. 9A, 9B.

For example, consider the case where parts A and B of a control program X have a bug. In both cases, these bugs are corrected due to updating of the ROM 4 by the external tool 2.

Figure 8A:
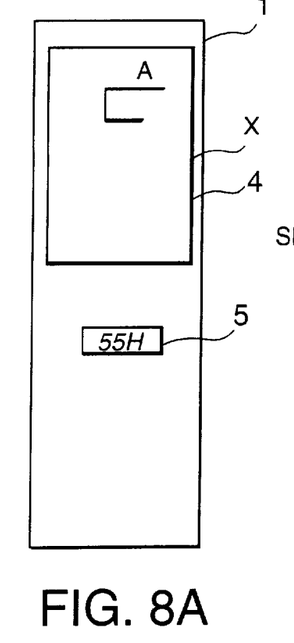
FIGS. 8A and 8B are diagrams describing learning value changes before and after updating the ROM according to the second embodiment of this invention.
Figure 8B:
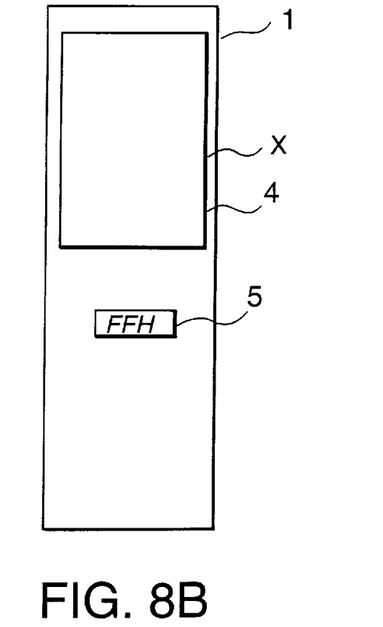

The following two types of bug may occur.

(1) The effect of the bug extends to the learnt value (case of FIG. 8A), (2) The effect of the bug does not extend to the learnt value (case of FIG. 8B).

It will be assumed that bug A is of type (1), and bug B is of type (2).

Consider the case where there are no production error and time dependent deterioration in the auxiliary air valve and the step motor. If the learnt value before performing update of the program is 55H while the initial value of the learnt value is FFH, the learnt value is incorrect due to incorrect learning as a result of bug A. In this case, the learnt value should not be preserved.

According to the second embodiment, after updating the program, the learnt value in the non-volatile RAM 5 is initialized to the initial value FFH as shown in FIG. 8B, and the incorrect learnt value due to bug A is therefore eliminated by updating the control program of the ROM 4.

Figure 9A:
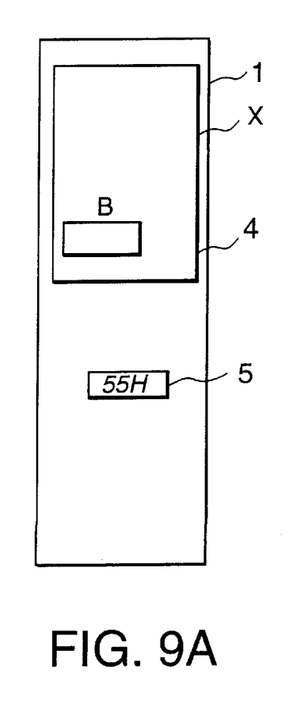
FIGS. 9A and 9B are diagrams describing learning value changes before and after updating the ROM according to the third embodiment of this invention.
Figure 9B:
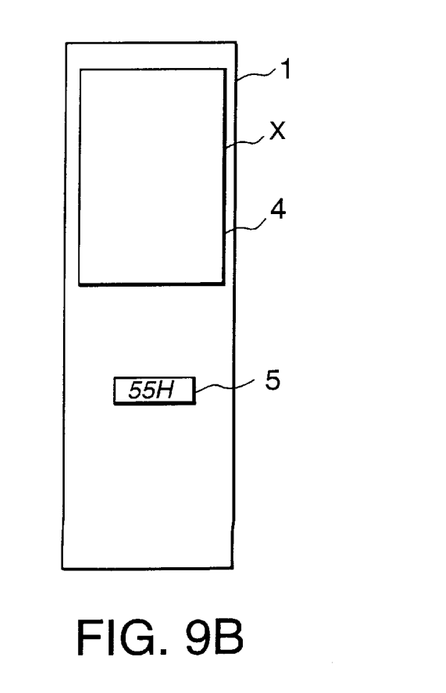

On the other hand, as bug B does not lead to incorrect learning, it is desirable to save the learnt value in order to maintain continuity of control before and after update of the control program. The third embodiment meets this demand. As shown in FIG. 9B, the learnt value 55H before update is stored as it is in the non-volatile RAM 5 even after updating of the control program stored in the ROM 4.

According to the first embodiment, if the learnt value in the non-volatile RAM 5 is updated, updating of the ROM 4 is not performed and therefore the learnt value is not initialized, but there are less opportunities for updating the ROM 4.

The aforementioned embodiments described the case where the idle rotation speed of an engine is controlled through an auxiliary air valve and step motor, however this invention may more generally be applied to all control units which control actuators including a control unit for an automatic transmission.

The embodiments of this invention in which an exclusive property or privilege is claimed are defined as follows:

1. A controller for controlling an actuator, comprising;

a microprocessor comprising a program storage memory for storing a control program for performing learning control of the actuator using a learnt value and a learnt value storage memory for storing the learnt value; and an external tool connectable to the microprocessor so as to replace the control program in the program storage memory with another control program;

wherein the microprocessor is programmed to determine whether or not the learnt value in the learnt value storage memory is equal to a predetermined initial value, and to prohibit replacement of the control program by the external tool when the learnt value in the learnt value storage memory is not equal to the predetermined initial value.

2. A controller as defined in claim 1, wherein said program storage memory and learnt value storage memory comprise memories for retaining the stored contents when the microprocessor is not operating.

3. A controller as defined in claim 1, wherein the control program comprises an engine idle rotation speed control program for controlling a step motor which increases and decreases an opening of an engine auxiliary air valve.

4. A controller as defined in claim 1, wherein the microprocessor is further programmed to return the learnt value in the learnt value storage memory to the predetermined initial value when the learnt value in the learnt value storage memory is not equal to the predetermined initial value.

5. A controller as defined in claim 4, wherein the microprocessor is further programmed to allow the external tool to replace the control program in the program storage memory with another control program when a predetermined time period has passed after the learnt value in the learnt value storage memory was returned to the predetermined initial value.

6. A controller as defined in claim 5, wherein the microprocessor is further programmed to compute a difference between the learnt value in the learnt value storage memory and the predetermined initial value, when the learnt value in the learnt value storage memory is not equal to the predetermined initial value, and transmit the difference to the external tool prior to returning the learnt value in the learnt value storage memory to the predetermined initial value, and wherein the external tool corrects the predetermined initial value in the learnt value storage memory based on the difference when the external tool is signaled to replace the control program in the program storage memory with another control program.

7. A controller as defined in claim 1, wherein the external tool transmits a specific code to the microprocessor, and the microprocessor is further programmed to prohibit replacement of the control program by the external tool when the microprocessor does not receive the specific code.

8. A controller for controlling an actuator, comprising:

a microprocessor comprising a program storage memory for storing a control program for performing learning control of the actuator using a learnt value and a learnt value storage memory for storing the learnt value; and an external tool connectable to the microprocessor so as to replace the control program in the program storage memory with a second control program;

wherein the microprocessor is programmed to
determine whether or not the learnt value in the learnt value storage memory is equal to a predetermined initial value by computing a difference between the learnt value and the predetermined initial value,
replace the control program by the external tool when the learnt value in the learnt value storage memory is equal to the predetermined initial value, and
prohibit replacement of the control program by the external tool when the learnt value in the learnt value storage memory is not equal to the predetermined initial value.

9. A controller as defined in claim 8, wherein said microprocessor further comprises a learnt value update frequency counter, wherein the learnt value update frequency counter has an initial value and is incremented to a greater value than the initial value for each update of the learnt value.

10. A controller as defined in claim 9, wherein said microprocessor is further programmed to prohibit replacement of the control program by the external tool when the learnt value update frequency counter has a value greater than the initial value of the learnt value update frequency counter.

11. A controller as defined in claim 8 a wherein the microprocessor is further programmed to
transmit the difference to the external tool, and
return the learnt value to the predetermined initial value, wherein the external tool is programmed to correct the initial value based on the difference.

* * * * *